US008398861B2

(12) United States Patent
Miyasaka et al.

(10) Patent No.: US 8,398,861 B2
(45) Date of Patent: Mar. 19, 2013

(54) SEPARATION METHOD

(75) Inventors: Masatoshi Miyasaka, Osaka (JP); Tamao Kojima, Osaka (JP); Hiroyuki Naka, Osaka (JP)

(73) Assignee: Panasonic Corporation, Osaka (JP)

( * ) Notice: Subject to any disclaimer, the term of this patent is extended or adjusted under 35 U.S.C. 154(b) by 408 days.

(21) Appl. No.: 12/742,461

(22) PCT Filed: Oct. 7, 2009

(86) PCT No.: PCT/JP2009/005206

§ 371 (c)(1), (2), (4) Date: May 12, 2010

(87) PCT Pub. No.: WO2010/050126

PCT Pub. Date: May 6, 2010

(65) Prior Publication Data

US 2010/0261864 A1 Oct. 14, 2010

(30) Foreign Application Priority Data

Oct. 28, 2008 (JP) ................................ 2008-277021

(51) Int. Cl.
*B01D 15/00* (2006.01)
*B03B 13/02* (2006.01)

(52) U.S. Cl. ........ 210/660; 210/662; 210/745; 210/783; 209/1; 209/12.1; 209/44.1; 209/577; 241/20; 264/37.1; 264/40.1

(58) Field of Classification Search .................... 209/11, 209/576, 577, 580, 581, 582, 509, 552, 598, 209/12.1, 44.1; 210/638, 662, 739, 745, 210/773, 660, 783; 241/20, 21, 23, 24.12, 241/24.18, 24.28; 264/37.1, 37.18, 40.1
See application file for complete search history.

(56) References Cited

U.S. PATENT DOCUMENTS

| | | | | |
|---|---|---|---|---|
| 3,208,286 | A * | 9/1965 | Richard | 73/865.5 |
| 5,484,062 | A | 1/1996 | Rich | |
| 5,807,490 | A * | 9/1998 | Davis et al. | 210/739 |
| 7,863,409 | B2 * | 1/2011 | Miyasaka et al. | 528/480 |

(Continued)

FOREIGN PATENT DOCUMENTS

| | | |
|---|---|---|
| GB | 2 229 116 | 9/1990 |
| JP | 63-52859 | 4/1988 |

(Continued)

OTHER PUBLICATIONS

Extended European Search Report (in English language) issued Aug. 17, 2012 in corresponding European Patent Application No. 09823241.6.

*Primary Examiner* — Joseph Drodge
(74) *Attorney, Agent, or Firm* — Wenderoth, Lind & Ponack, L.L.P.

(57) ABSTRACT

A separation method for extracting a target 1 from a separation subject (101) in which the target (1) to be extracted and a non-target (2) are mixed. The method includes the steps of distinguishing the target (1) from the non-target (2); obtaining positional information of the target (1) distinguished; attaching a liquid to the target (1) based on the positional information; and extracting the target (1) from the separation subject (101) by bringing a catch member (140) into contact with the separation subject (101) such that viscosity of the liquid causes the target (1) to adhere to the catch member.

18 Claims, 8 Drawing Sheets

U.S. PATENT DOCUMENTS

| | | | | |
|---|---|---|---|---|
| 7,900,856 | B2 * | 3/2011 | Kojima et al. | 241/22 |
| 8,127,933 | B2 * | 3/2012 | Bohlig et al. | 209/555 |
| 8,286,800 | B2 * | 10/2012 | Kojima et al. | 209/631 |
| 2006/0001187 | A1 * | 1/2006 | Allen III et al. | 264/40.1 |
| 2008/0197056 | A1 * | 8/2008 | Kenny | 209/644 |
| 2008/0257796 | A1 * | 10/2008 | Jukkola | 209/576 |
| 2009/0277834 | A1 * | 11/2009 | Vero et al. | 210/638 |

FOREIGN PATENT DOCUMENTS

| | | |
|---|---|---|
| JP | 64-060547 | 3/1989 |
| JP | 2000-108126 | 4/2000 |
| JP | 2002-234031 | 8/2002 |
| JP | 2002-361181 | 12/2002 |
| JP | 2005-000725 | 1/2005 |

* cited by examiner

| Liquid viscosity U (mPa · s) | Weight of target per unit area D× ρ (mg/mm²) |
|---|---|
| 0.89 | 13.8 |
| 2.4 | 13.8 |
| 11.7 | 18.4 |
| 21 | 23 |

FIG. 13

| | | Rigid member | Pliable member |
|---|---|---|---|
| Liquid amount ($\mu\ell$) | 0.2 | 30% | 75% |
| | 0.3 | 60% | 100% |
| | 0.4 | 95% | 100% |

SEPARATION METHOD

BACKGROUND OF THE INVENTION

1. Technical Field

The present invention relates to a separation method intended to extract a target, using viscosity of a liquid, from a separation subject in which the target and a non-target are mixed.

2. Description of the Related Art

In recent years, economic activities represented by mass production, mass consumption, and mass disposal have caused environmental problems on a global scale, such as global warming and depletion of resources. Under such circumstance, in Japan, Home Appliance Recycling Law, which came into effect in April 2001, obliges recycling of used air conditioners, televisions, refrigerators/freezers, and washing machines, to build a recycling society.

Conventionally, unneeded home appliances have been recycled by crushing and then separating them by material, using magnetism, wind, oscillation, etc., in home appliance-recycling plants. The recycling rate of heavy metal materials used for home appliances is high because the use of a specific-gravity separation device or a magnetism separation device allows these materials to be separated by material such as iron, copper, aluminum, etc., and thus recovered in very pure form.

Resin components in home appliances may be separated using water. For example, a resin component of polypropylene (hereinafter denoted as PP), which has a low specific gravity, is separated from a component having a high specific gravity through specific gravity segregation using water and thus recovered with a relatively high degree of purity. This separation method using water, however, has a problem that an enormous amount of wastewater is produced, and further has a significant problem that polystyrene (hereinafter denoted as PS) and acrylonitrile-butadiene-styrene (hereinafter denoted as ABS), which have close specific gravities, are not separated from each other.

In addition, with concern for depletion of rare metals, the development of technology for recovering rare metals from precision equipment and the like has become an issue.

Particularly, as to the recycling of resin components, separation methods in consideration of the above problems have been proposed in Japanese Unexamined Patent Application Publication No. 2002-234031 and Japanese Unexamined Patent Application Publication No. 2000-108126.

JP 2002-234031 discloses a method of separating resin components that are different in constituent resin substance. The method uses a difference in dielectric loss between the resin components. In this method, a separation subject having resin components of two or more resin kinds is subjected to dielectric heating using electromagnetic waves or the like so that the resin components, which are molten differently from each other, are separated from each other.

JP 2000-108126 discloses a method of separating resin constituents which uses near infrared rays to detect a difference in peak wavelength between the resin materials. In this method, resin components of a desired resin kind are separated from a separation subject in such a manner that resin kinds of constituent substances are specified using a resin property that constituent resin substances of different kinds have different wavelength peak positions in a near infrared region, and according to the specified resin kinds, only resin components of a predetermined resin kind are blown off by means of an air nozzle or the like. It is highly likely that a group of the separated resin components is made of resin substances, which are the same in kind, resulting in a higher degree of purity.

These separation methods produce no wastewater and are not influenced by the specific gravity of a resin component.

SUMMARY OF THE INVENTION

1. Technical Problem

However, in the invention disclosed by JP 2002-234031, it is not possible to separate resin components whose dielectric losses are slightly different from each other. It is thus hard to recover resin components of the same resin kind accurately.

In the invention disclosed by JP 2000-108126, an electromagnetic valve for blowing off the resin components of a specified resin kind with air tends to be complex in structure. Moreover, it is hard to perform a precise control of blowing only the resin components of a desired resin kind off minute resin components of different resin kinds, resulting in difficulties in improving accuracy of separating resin components by resin kind. In addition, since a pitch of the air nozzle and a shape of the resin component affect the performance, it is hard to recover resin components of the same resin kind accurately from the separation subject in which small-sized resin components are mixed.

On object of the present invention is to provide a separation method which solves the above existing problems and not only enables accurate separation in a simple process but also is applicable to even a separation subject in which a target and a non-target small in size are mixed.

2. Solution to the Problem

In order to solve the above problems, a separation method according to an aspect of the present invention is a separation method of extracting a target from a separation subject in which the target to extract and a non-target not to extract are mixed. The separation method includes: distinguishing the target from the non-target; obtaining positional information of the target distinguished in the distinguishing; attaching a liquid to the target based on the positional information; and extracting the target from the separation subject by bringing a catch member into contact with the separation subject such that viscosity of the liquid causes the target to adhere to the catch member, wherein all of the following expressions (1) to (4) are satisfied: (1) $D\times\rho\leqq 23$; (2) $(Y\times U)/A\geqq 0.1055\times e\hat{}(0.255\times D\times\rho)$; (3) $(Y\times U)/A\geqq 1.05$; and (4) $Y/(A\times U)\leqq -1.2\times \mathrm{Ln}(D\times\rho)+3.8$ where Y is an amount (in μl) of the liquid attached to the target, U is the viscosity (in mPa·s) of the liquid, D is a thickness (in mm) of the target, A is an area (in $cm^2$) of the target, and ρ is density (in $mg/mm^3$) of the target.

This makes it possible to extract the target from the separation subject without being so affected by the size of the target, thus enabling accurate separation.

Furthermore, it is preferable that, in the distinguishing step, the target and the non-target be distinguished by a difference in constituent substance.

This enables separation by constituent substances.

Furthermore, the method may include shaping the target and the non-target included in the separation subject until the target and the non-target reach a predetermined thickness.

This enables further improvement of the separation accuracy.

3. Advantageous Effects of the Invention

As described above, in the separation method and the separation apparatus according to the present invention, a liquid is attached only to the target so that the target adheres to the catch member, with the result that only the target can be extracted from the separation subject. In the case where a liquid is applied to the target, the liquid can be attached to the target selectively and with a very narrow pitch. The present invention is therefore effective for small components of such a size that the conventional technique is unable to separate.

BRIEF DESCRIPTION OF THE DRAWINGS

FIG. 1(*a*) is a front view thereof and FIG. 1(*b*) is a top view thereof.

FIG. 13 is a table showing a difference in an adhering ratio depending on types of a catch member.

DETAILED DESCRIPTION OF THE INVENTION

Preferred embodiments of the present invention shall be explained below with reference to the drawings.

Figure 1:
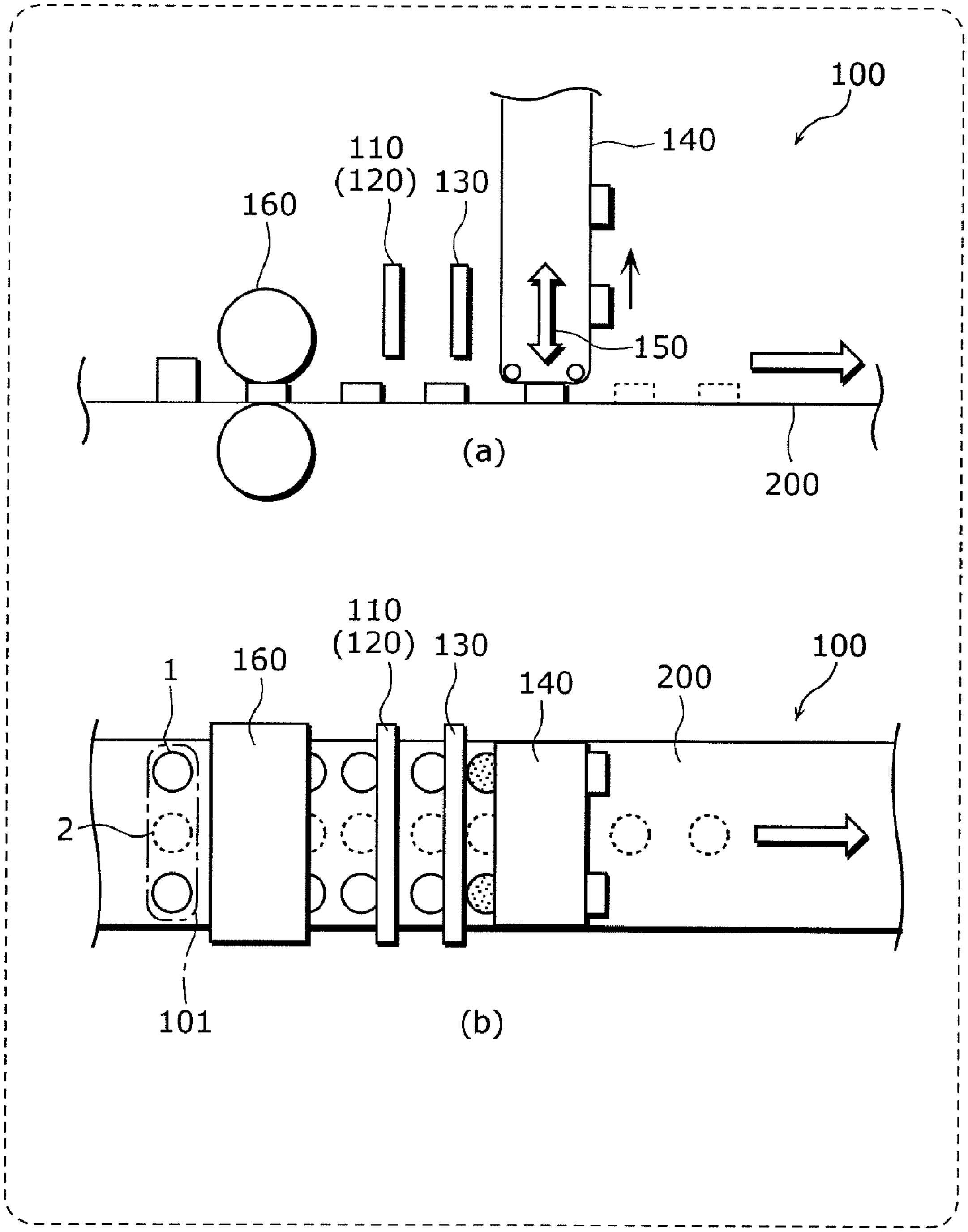
FIG. 1 is a view schematically showing a separation apparatus according to an embodiment of the present invention.

FIG. 1 is a view schematically showing a separation apparatus according to a first embodiment of the present invention; FIG. 1(*a*) is a front view thereof and FIG. 1(*b*) is a top view thereof.

As shown in FIG. 1, a separation apparatus 100 is a separation apparatus for extracting a target 1 from a separation subject 101 in which the target 1 and a non-target 2 are mixed, and includes a distinguishing unit 110, a positional information obtaining unit 120, an applying unit 130, a catch member 140, an actuator 150, and a shaping unit 160.

The distinguishing unit 110 is a device for distinguishing the target 1 from the non-target 2. The distinguishing unit 100 is, for example, a device which captures an image of the separation subject and analyzes the resultant image to distinguish the target 1 from the non-target 2 by color, shape, design, and so on, or a device which includes a sensor having the highest sensitivity among sensors of various types such as near infrared sensors, middle infrared sensors, x-ray sensors, and image recognition sensors, and distinguishes the target 1 from the non-target 2 based on a difference in constituent substance between the target 1 and the non-target 2.

In the case of the separation apparatus 100 according to the present embodiment of the present invention, the separation subject 101 is transported in an arrow direction on a belt conveyor 200 serving as a separation station 3, and the distinguishing unit 110 is capable of obtaining positional information indicating where the constituent substance of the target 1 is present and positional information indicating where other constituent substances are present, with a sensor scanning in a direction which intersects the transport direction of the belt conveyor 200. Thus, in the case of the present embodiment, the distinguishing unit 110 functions also as the positional information obtaining unit 120 for obtaining the positional information of the target 1.

The applying unit 130 is a device for selectively applying a liquid to only the target 1 based on the positional information of the target 1 received from the distinguishing unit 110 serving also as the positional information obtaining unit 120. In the present embodiment, the applying unit 130 includes a nozzle capable of injecting a predetermined amount of droplets of the liquid with predetermined timing, and is capable of applying the liquid to the target 1 at any position by moving the nozzle in a direction which intersects the transport direction of the belt conveyor 200.

The catch member 140 is a member which comes into contact with the separation subject 101 and thereby holds the target 1 in the state of adherence due to the viscosity of the liquid. In the present embodiment, the catch member 140 is in the form of an endless belt.

In addition, the catch member 140 may be either rigid so that its surface to which the target 1 adheres stays flat when the separation subject 101 and the catch member 140 are making contact, or pliable (elastic) so that the surface can follow concavities and convexities of the separation subject 101 when the separation subject 101 and the catch member 140 are making contact.

Particularly, the catch unit 140 having pliability is advantageous for the target 1 which is different in thickness from one position to another or which is different in thickness from another target 1 or the non-target 2.

FIG. 13 is a table showing a difference in an adhering ratio depending on types of a catch member.

The separation subject 101 was prepared in which the target 1 and the non-target 2 each having a thickness in the range of 1.15 mm to 2.3 mm were mixed, and as the catch member 140 which is rigid, a stainless steel plate was prepared while as the catch member 140 which is pliable, a silicon rubber plate was prepared. The vertical axis of the table shown in FIG. 13 represents an amount (μl) of the liquid having viscosity U of 0.89 mPa·s attached to the target 1 having a material area of 36 $mm^2$ and a thickness of 1.15 mm to 2.3 mm. A numerical value stated in each square indicates a proportion of the number of targets 1 adhering to the catch member 140, to the total number of targets 1, that is, an adhering ratio (%). This result shows that the catch member

140 which is pliable is effective for the separation subject 101 which is different in thickness from one position to another. However, the catch member 140 which is rigid may be more advantageous in consideration of degradation of the catch member 140, a peeling performance of the target 1 from the catch member 140, maintenance, etc. Accordingly, in selecting a constituent substance for the catch member 140, it is desirable to select a suitable catch member 140 according to conditions including the irregular thickness of the target 1.

The actuator 150 is a device which is capable of moving the catch member 140 relatively to the separation subject 101. In the present embodiment, the actuator 150 is a device which is capable of reciprocating the catch member 140 toward and away from the separation subject 101.

The shaping unit 160 is a device which decreases the thickness of the separation subject 101 to a predetermined level. In the predetermined embodiment, the shaping unit 160 is exemplified by a press roll which applies pressure to the separation subject 101, thereby setting the thicknesses of the target 1 and the non-target 2. The use of the press roll is preferable because it is capable of consecutively homogenizing the thickness of the separation subject 101.

Alternatively, the shaping unit 160 may be a flat press. Moreover, the shaping unit 160 may be provided with a cutter which adjusts not only the thickness but also an area of a surface perpendicular to the thickness direction.

Furthermore, in the case of using the press roll, it may be of either an upright type or a transverse type. The use of the press roll is preferable because it is capable of homogenizing the thickness of the separation subject 101 effectively by optimizing a roll gap, a roll diameter, the number of roll turns, a roll temperature, or the number of rolls.

It is to be noted that the present invention is not limited to the above embodiment. For example, the distinguishing unit 110 may be one which is provided with multiple sensors arranged in array or matrix pattern and distinguishes the targets 1 in multiple positions at a time. The applying unit 130 may be one which is provided with multiple nozzles arranged in array or matrix pattern and applies the liquid to the targets 1 in multiple positions at a time. Alternatively, the applying unit 130 may be a device which paints the target 1 with the liquid. The catch member 140 is not needed to be in the form of an endless belt and may be of any shape including a shape of a piece of paper and a platy shape.

Next, the separation method according to the present embodiment will be explained.

Figure 2:
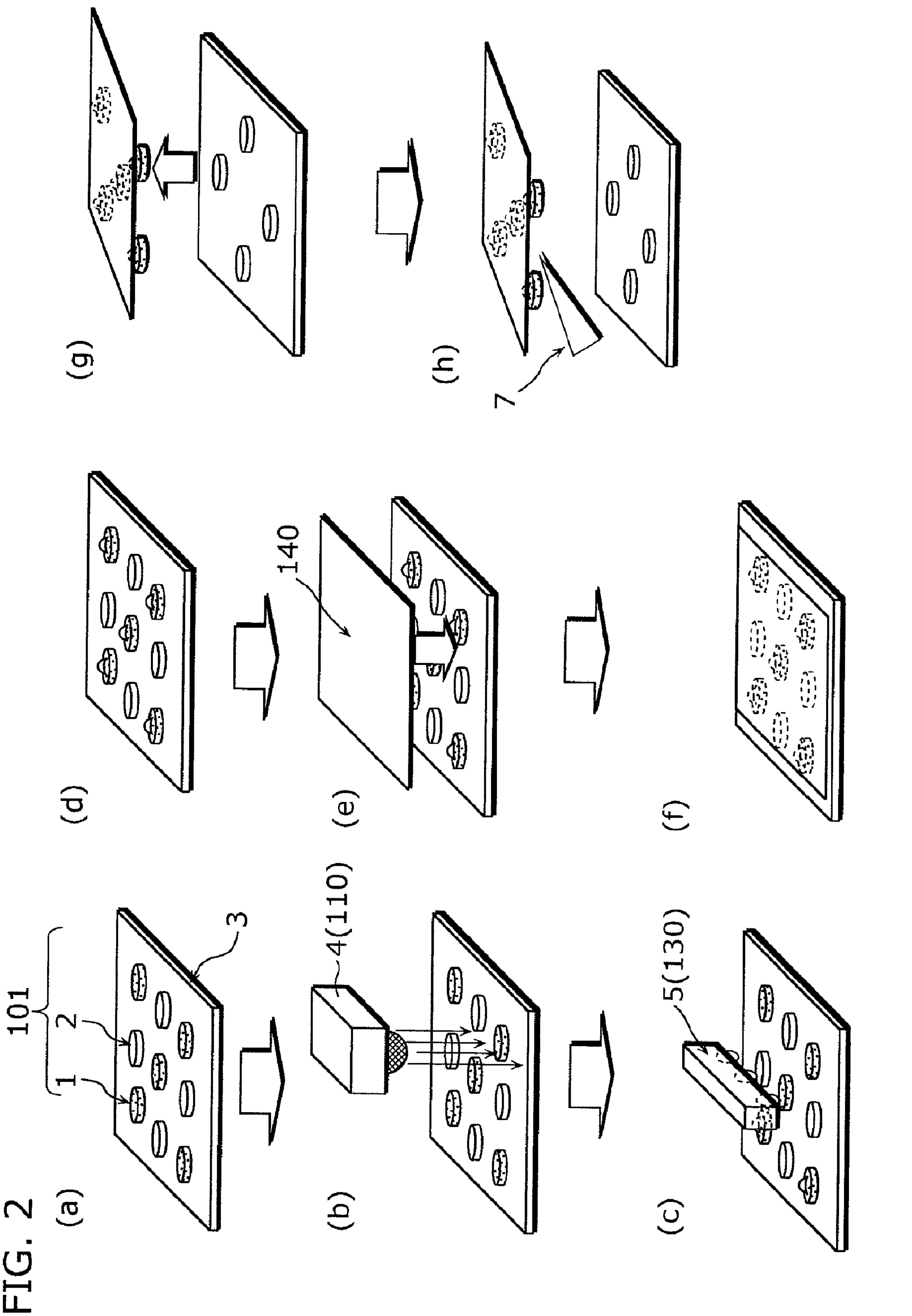
FIGS. 2(*a*) to 2(*h*) are a process chart schematically showing a separation method of extracting targets made of a first constituent substance from a separation subject in which the targets and a non-targets made of a second constituent substance are mixed.

FIGS. 2(*a*) to 2(*h*) schematically show a separation method of extracting targets 1 made of a first constituent substance from the separation subject in which the targets 1 and non-targets 2 made of a second constituent substance are mixed.

First, the separation subject 101 of which the thickness has been set in a shaping step is placed on the separation station 3 which has been sufficiently dried (FIG. 2(*a*)).

Next, the constituent substances of the targets 1 and the non-targets 2 are distinguished with a distinguishing sensor 4 which is provided in the distinguishing unit 110 so as to face the separation subject 101. The distinguishing sensor 4 is a sensor capable of distinguishing the target 1 by a difference in constituent substance, and the distinguishing unit 110 is one which is capable of obtaining positional information indicating a position in which the distinguishing sensor 4 has distinguished the constituent substance of the targets 1 (FIG. 2(*b*)) (a distinguishing step and an positional information obtaining step).

Next, on the basis of the positional information obtained, the applying unit 130 including the nozzle 5 is controlled so as to spray the liquid so that droplets of the liquid are attached only to the targets 1 (FIG. 2(*c*)) (an applying step). FIG. 2(*d*) shows a state where the liquid is attached only to the targets 1.

Next, the catch member 140 is moved relatively toward the separation subject 101 (FIG. 2(*e*)), and the catch member 140 is then brought into contact with the separation subject 101 including the targets 1 and the non-targets 2 (FIG. 2(*f*)). The targets 1 thus adhere, from above the separation subject 101, to the sufficiently dried catch member 140 via the liquid (an adhering step).

Afterwards, the catch member 140 is moved relatively away from the separation subject 101 so that only the targets 1 adhering to the catch member 140 are extracted from the separation subject 101 (FIG. 2(*g*)) (an extracting step).

Next, the targets 1 adhering to the catch member 140 are separated from the catch member 140 with the use of a blade 7 (FIG. 2(*h*)) (a collecting step).

Through the foregoing, only the target 1 can be collected from the separation subject 101 with a relatively high degree of purity. The non-target 2 remaining on the separation station 3 can be easily collected. Moreover, it is also possible that by repeating the above steps multiple times, the targets 1 made of different constituent substances are collected from the separation subject 101 for each of the constituent substances in turn.

In addition, if the catch member 140 is made of the same constituent substance as the target 1, it is possible to collect the target 1 together with catch member 140 to which the target 1 still adheres.

Figure 3:
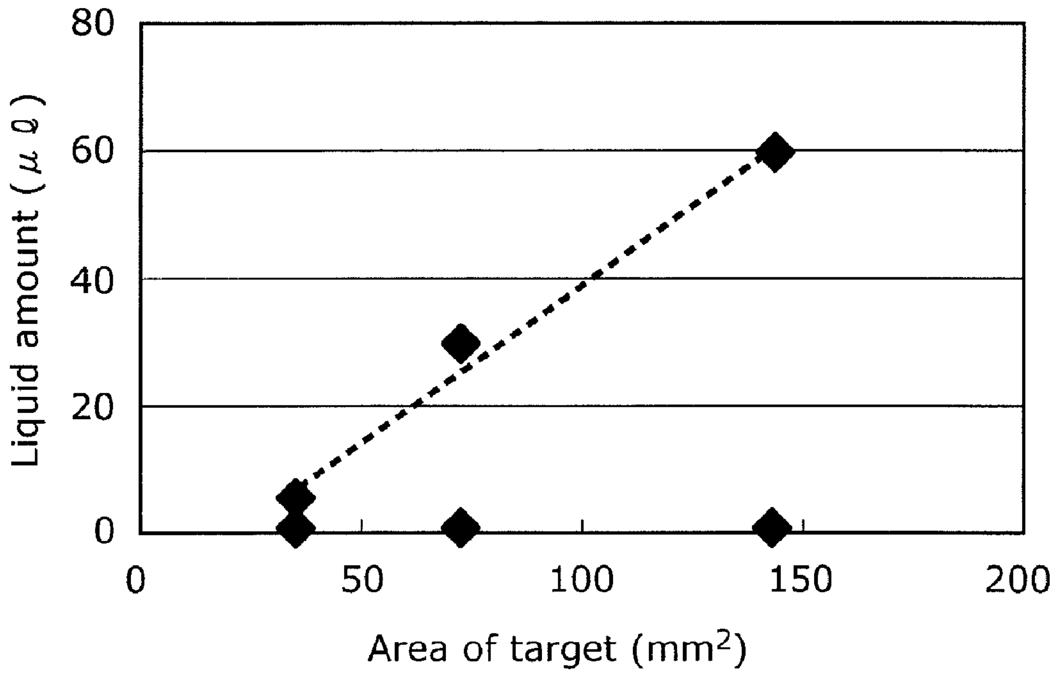
FIG. 3 is a graph showing a relation between an amount of a liquid to be attached for causing adherence of the target, and an area of a surface of the target to which the liquid is attached.

FIG. 3 is a graph showing a relation between an amount of the liquid to be attached for causing adherence of the target, and an area of a surface of the target to which the liquid is attached.

Figure 4:
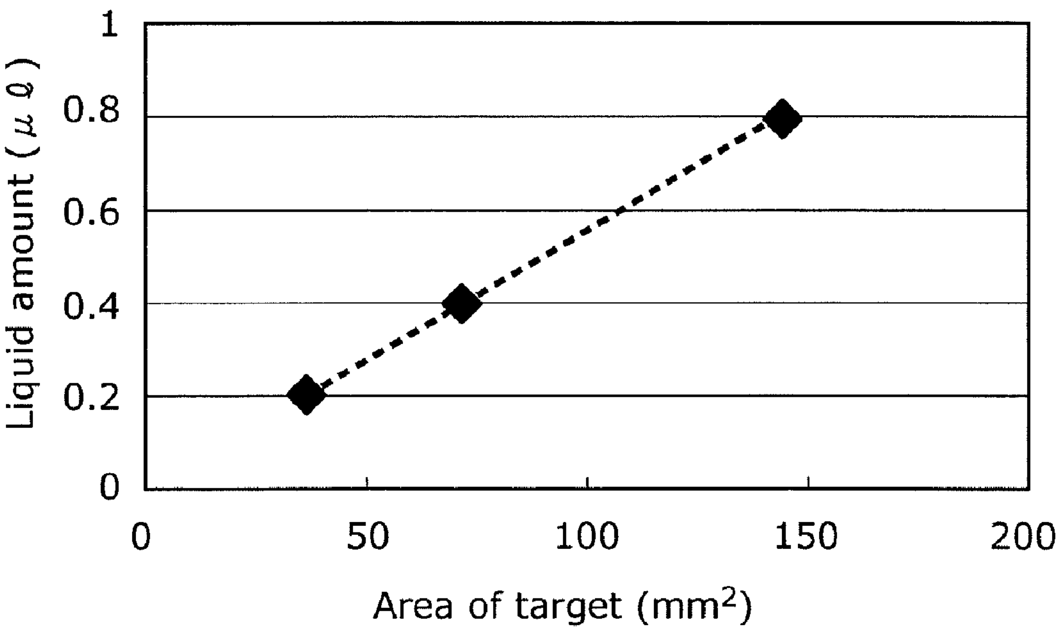
FIG. 4 is a graph showing a magnified view of a y-axis lower region of the graph shown in FIG. 3.

FIG. 4 is a graph showing a magnified view of a y-axis lower region of the graph shown in FIG. 3.

As is clear from FIGS. 3 and 4, the area of the surface of the target 1 to which the liquid is attached (hereinafter referred to as "target area A") is proportional to an amount of the liquid to be attached for allowing adherence. As shown in FIG. 3, as the target area A increases, the area of the liquid between the target 1 and the catch member 140 increases, and accordingly, the minimum amount of the liquid to be attached for causing the adherence increases in proportion.

Furthermore, as shown in FIG. 3, as the target area A increases, the maximum amount of the liquid to be attached for causing the adherence also increases in proportion. This proportional relation shows that an amount of the liquid to be attached for causing the adherence per unit area of the target area A is constant.

Figure 5:
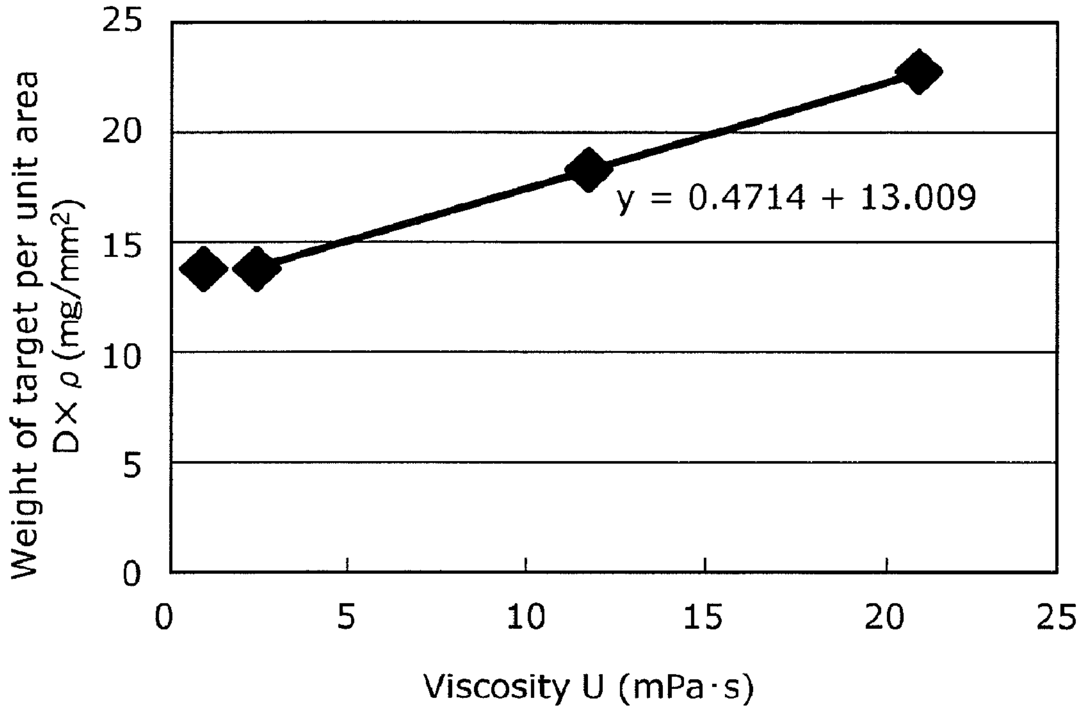
FIG. 5 is a graph showing a relation between viscosity of the liquid and the maximum weight of the target per unit area which can adhere.

FIG. 5 is a graph showing a relation between the viscosity of the liquid and the maximum weight of the target per unit area which can adhere.

It was found that there is a proportional relation that as the viscosity U of the liquid increases, the maximum weight of the target per unit area which can adhere (hereinafter referred to as "target weight") increases.

This means that a higher viscosity of the liquid is more advantageous for adhering of the target 1.

Therefore, in the following, an area of the target 1 which can adhere will be explained for each level of the viscosity U of the liquid. Among three sides of the target 1 corresponding to three-dimensional axes, the length of the shortest side is defined as a thickness D (mm). In the case of consequently discharging droplets of the liquid and thereby attaching the liquid to the target 1, the viscosity of the liquid is desirably less than approximately 25 mPa·s. It is thus preferable to use the liquid having the viscosity in the range below such a level.

Second Example

The present invention will be explained hereinbelow in more detail by another example.

The target 1 is made of PP that is a thermoplastic resin, and the non-target 2 is made of PS that is a thermoplastic resin. The following will explain a separation method in which the target 1 made of PP is extracted from the separation subject 101 in which the target 1 and the non-target 2 made of such different resins are mixed.

As the distinguishing unit 110, a near infrared analyzer (IR device: Necolet AVATAR 360, Measurement technique: ATR technique, and wavelength range: 4,000 $cm^{-1}$ to 650 $cm^{-1}$) was used.

As the applying unit 130, Micropipette (3111-2.5 model manufactured by Eppendorf Co., Ltd.) was used.

The separation subject 101 was placed on a pressure plate of a flat press and pressurized for sixty minutes via a spacer until the thickness D falls into the range of 1.15 mm to 24.0 mm.

Both of the target 1 and the non-target 2 were cut with a cutter so that the target area A has 36 $mm^2$.

As the catch member 140, a woven wire made of stainless steel was used. The catch member was 0.28 mm in opening, 0.23 mm in wire diameter, 150 mm×150 mm in size, and 1 mm in thickness.

Using the above units and members, the separation method according to the present invention was implemented.

First, the separation subject 101 in which the target 1 and the non-target 2 were mixed was placed on the separation station 3. The amount of the separation subject 101 placed was such that a proportion of the total target area A of the separation subject 101 to the area of the separation station 3 was 45% to 55%. In addition, the separation subject 101 was placed in such a manner that none of the target 1 and the non-target 2 overlap.

Next, the separation subject 101 on the separation station 3 was distinguished by means of the distinguishing unit 110. On the basis of the information from the distinguishing unit 110, a human determined whether or not the target 1 was made of PP.

The applying unit 130 then put drops of the liquid only at a position of the target 1 whose material had been determined as PP.

The liquid used had it's viscosity adjusted into the range of 0.89 mPa·s to 21 mPa·s.

The amount of the liquid attached to the target 1 was set at 0.5 μl to 50 μl.

The liquid used was of three types; pure water, diethylene glycol (Super-high grade 045-25915 produced by Wako Pure Chemical Industries, Ltd.), and diethylene glycol dibutyl ether (Super-high grade 027-08275 produced by Wako Pure Chemical Industries, Ltd.), and the liquid of these types was used separately.

Next, the catch member 140 was placed on the separation subject 101. The weight of the catch member 140 causes adherence of the target 1 to the catch member 140. The length of time for which the catch member 140 was placed on the separation subject 101 was in the order of three seconds.

Next, the catch member 140 was lifted in parallel with the separation subject 101 to extract the target 1 from the separation subject 101.

In order to confirm that the target 1 was extracted, the time until the first one of the target 1 (ten pieces) adhering to the catch member 140 fell off was counted, and when this time was 10 seconds or more, it was determined that the target 1 was extracted.

It is to be noted that the experiment was repeated with the separation station 3 and the catch member 140 sufficiently dried.

Figure 6:
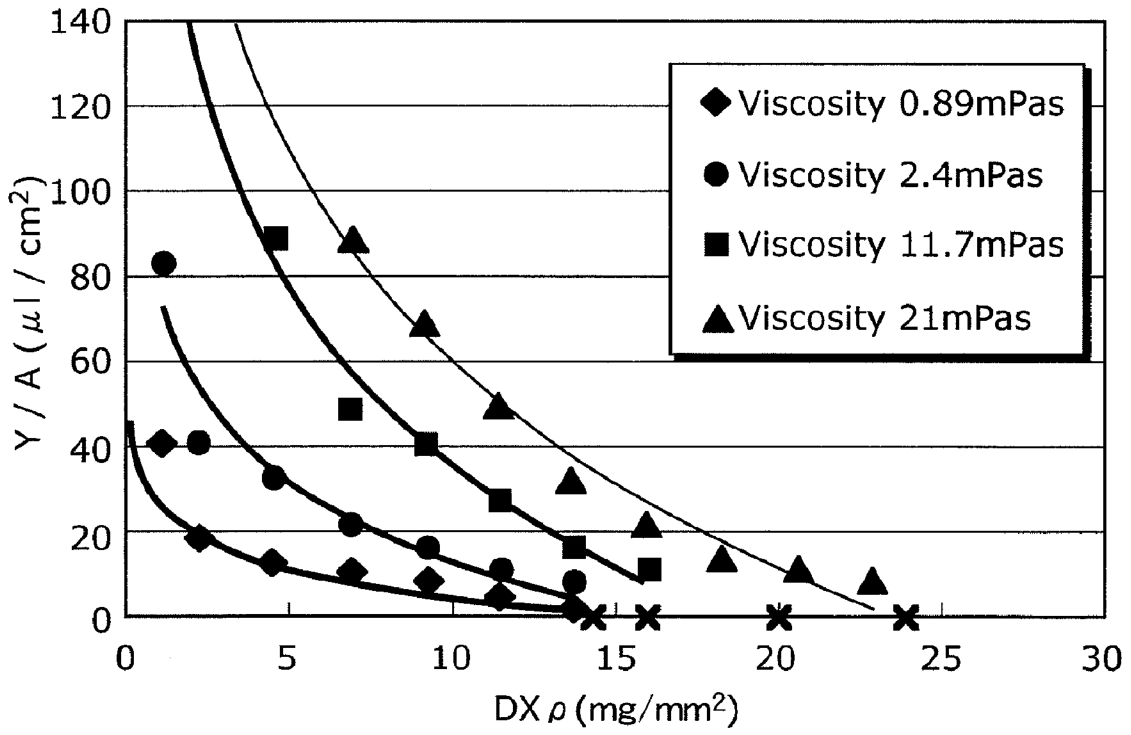
FIG. 6 is a graph showing a relation between a weight of the target for each level of viscosity of the liquid and an amount of the liquid to be attached per unit area.

FIG. 6 is a graph showing a relation between a weight of the target for each level of viscosity of the liquid and an amount of the liquid to be attached per unit area. The horizontal axis represents a target weight D×ρ ($mg/mm^2$), and the vertical axis represents an amount of the liquid Y/A ($\mu l/cm^2$) per unit area to be attached for causing the adherence.

Figures 7, 8:
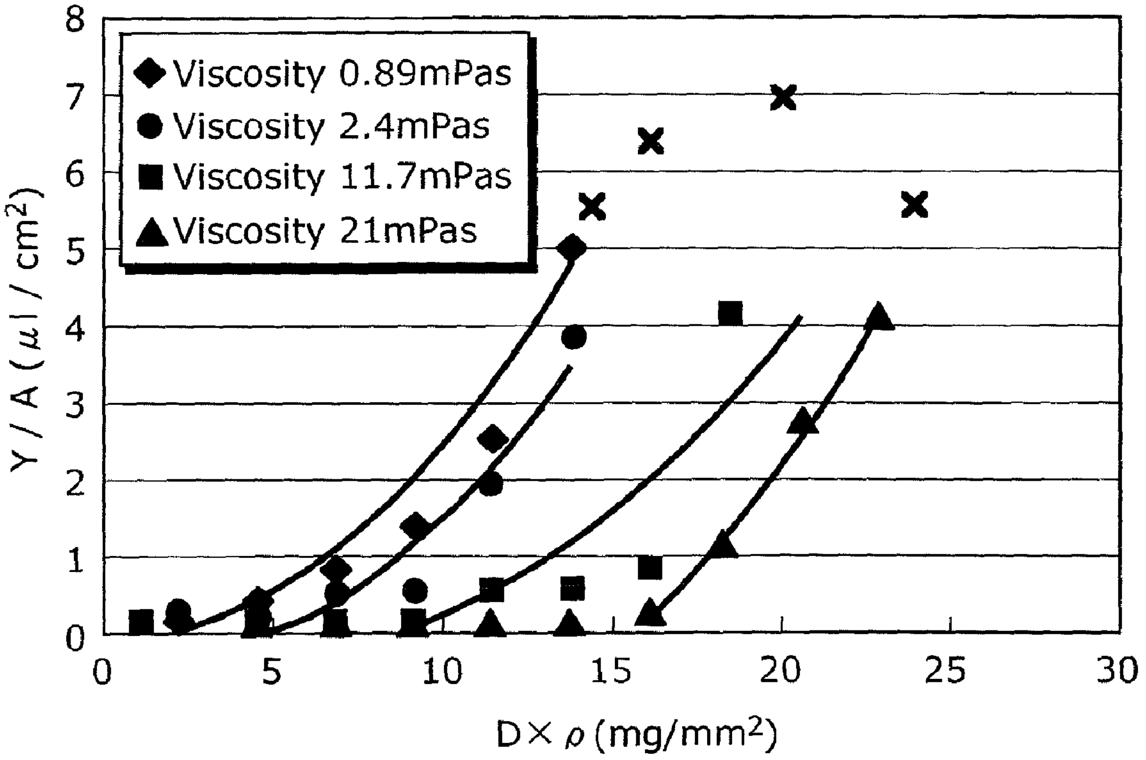
FIG. 7 is a graph showing a magnified view of a y-axis lower region of the graph shown in FIG. 6.
FIG. 8 is a table showing a relation between a level of viscosity of the liquid and a target weight.

FIG. 7 is a graph showing a magnified view of a y-axis lower region of the graph shown in FIG. 6.

With the viscosity U of the liquid constant, as the target weight D×ρ ($mg/mm^2$) increases, the minimum amount of the liquid per unit area to be attached for allowing adherence increases while the maximum amount of the liquid per unit area to be attached for allowing adherence decreases. In other words, with the viscosity U of the liquid constant, as the target weight D×ρ ($mg/mm^2$) increases, the range of the amount of the liquid to be attached for allowing adherence narrows.

For example, in the case where the viscosity U of the liquid is 0.89 mPa·s, the range of the amount of the liquid to be attached for allowing adherence of the target having a weight of 2.3 $mg/mm^2$ is 0.28 $\mu l/cm^2$ to 19.4 $\mu l/cm^2$. On the other hand, the range of the amount of the liquid to be attached for allowing adherence of the target having a weight of 9.2 $mg/mm^2$ is 1.4 $\mu l/cm^2$ to 8.3 $\mu l/cm^2$, which is thus clearly narrower than the range of the amount of the liquid to be attached for allowing adherence of the target having a weight of 2.3 $mg/mm^2$.

With the target weight constant, as the viscosity U of the liquid increases, the minimum amount of the liquid to be attached for allowing adherence decreases while the maximum amount of the liquid to be attached for allowing adherence increases. In other words, with the target weight constant, as the viscosity U of the liquid increases, the range of the amount of the liquid to be attached for allowing adherence expands. For example, in the case where the target weight is 9.2 $mg/mm^2$, the range of the amount of the liquid having the viscosity U of 0.89 mPa·s to be attached for allowing adherence is 1.4 $\mu l/cm^2$ to 8.3 $\mu l/cm^2$. On the other hand, the range of the amount of the liquid having the viscosity U of 21 mPa·s to be attached for allowing adherence is 0.14 $\mu l/cm^2$ to 69 $\mu l/cm^2$, which is thus clearly wider than the range of the amount of the liquid having the viscosity U of 0.89 mPa·s to be attached for allowing adherence.

In addition, for some of the target weight, even attaching a large amount of the liquid to the target will not result in adherence of the target, and as the viscosity U of the liquid increases, the target weight increases.

FIG. 8 is a table showing a relation between a level of the viscosity of the liquid and the target weight.

Referring to FIG. 8, the target having a thickness in excess of 23 mm is not able to adhere no matter what amount of the liquid was put on the target when the viscosity of the liquid is in the range satisfying 0.89 mPa·s≦U≦21 mPa·s. Consequently, the thickness of the target is preferably in the range of 1.15 mm to 23 mm.

Figure 9:
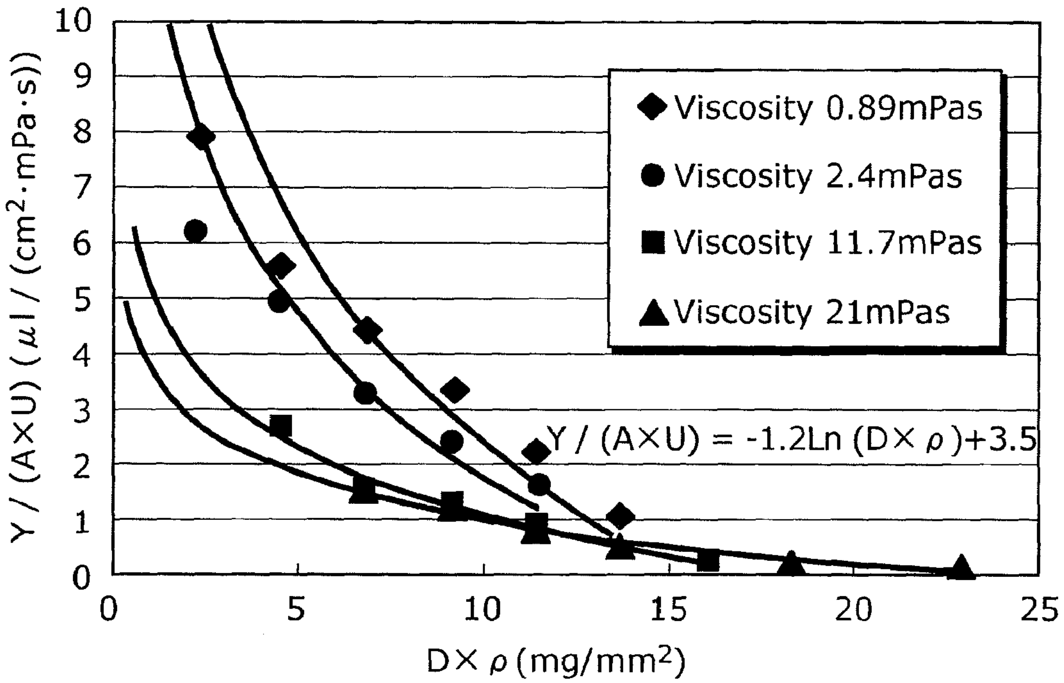
FIG. 9 is a graph showing a relation between a target weight for each level of viscosity of the liquid and a value resulting from dividing an amount of the liquid to be attached per unit area by the viscosity of the liquid.

FIG. 9 is a graph showing a relation between the target weight for each level of the viscosity U of the liquid and a value resulting from dividing the amount of the liquid to be attached per unit area by the viscosity of the liquid.

In the graph of FIG. 9, the horizontal axis represents the target weight D×ρ ($mg/mm^2$), and the vertical axis represents a value Y/(A×U) ($mg/cm^2\cdot mPa\cdot s$) resulting from dividing the amount of the liquid per unit area to be attached for causing the adherence by the viscosity of the liquid. According to FIG. 9, as the target weight increases, the value Y/(A×U) along the vertical axis decreases. With the target weight constant, as the viscosity U of the liquid increases, Y/(A×U) decreases. In other words, the value Y/(A×U) along the vertical axis is smallest when the viscosity is 21 mPa·s. Accordingly, the range where the target can adhere is given by the mathematical expression Y/(A×U)-1.2Ln(D×ρ)+3.8, when the viscosity U of the liquid is in the range of 0.89 mPa·s to 21 mPa·s.

Figure 10:
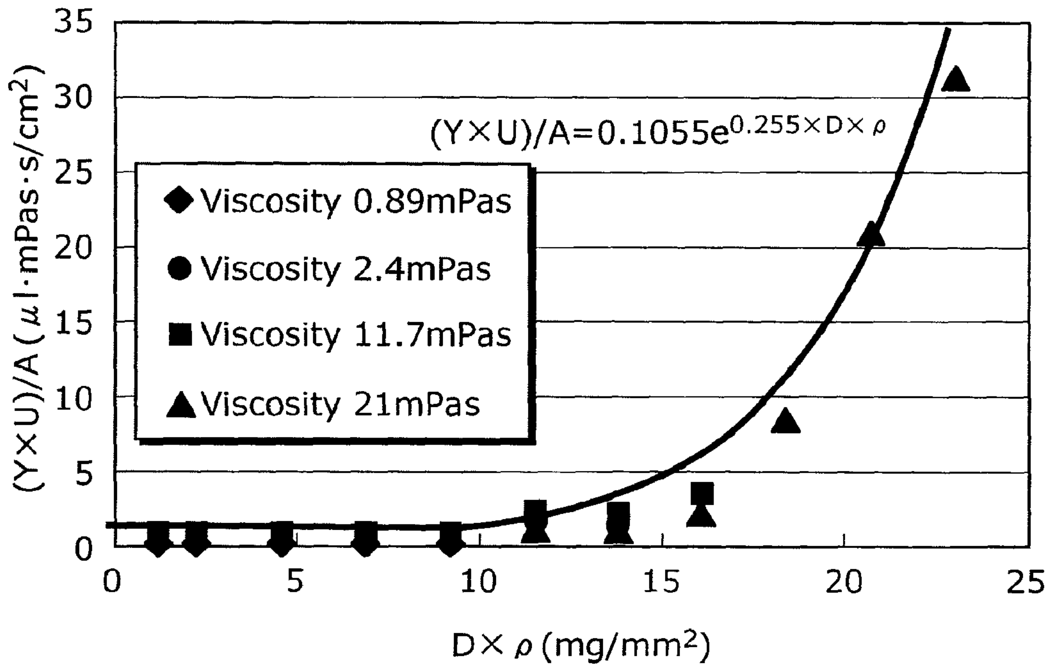
FIG. 10 is a graph showing a relation between a target weight for each level of viscosity of the liquid and a value resulting from multiplying an amount of the liquid to be attached per unit area by viscosity of the liquid.

FIG. 10 is a graph showing a relation between the target weight for each level of the viscosity of the liquid and a value resulting from multiplying an amount of the liquid to be attached per unit area by the viscosity of the liquid.

The horizontal axis represents the target weight ($mg/mm^2$), and the vertical axis represents a value ($mg/cm^2 \cdot mPa \cdot s$) resulting from multiplying an amount of the liquid per unit area to be attached for causing the adherence by the viscosity of the liquid. According to FIG. 10, as the target weight increases, the value (Y×U)/A along the vertical axis increases. With the target weight constant, as the viscosity U of the liquid increases, the value (Y×U)/A increases. In other words, the value (Y×U)/A along the vertical axis is smallest when the viscosity is 0.89 mPa·s. Accordingly, the range where the target can adhere is given by the mathematical expression (Y×U)/A≧0.1055e^(0.255×D×ρ), when the viscosity U of the liquid is in the range of 0.89 mPa·s to 21 mPa·s.

Referring to FIG. 10, (Y×U)/A in a lower region along the horizontal axis (D×ρ) is equal to or greater than 1.05, and it is thus necessary to satisfy at least (Y×U)/A≧1.05. In addition, (Y×U)/A in a higher region along the horizontal axis (D×ρ) is equal to or lower than 23, and it is thus necessary to satisfy (D×ρ)≦23. The above mathematical expressions are applied to the liquid having the viscosity in the range satisfying 0.89 mPa·s≦U≦21 mPa·s.

Figure 11:
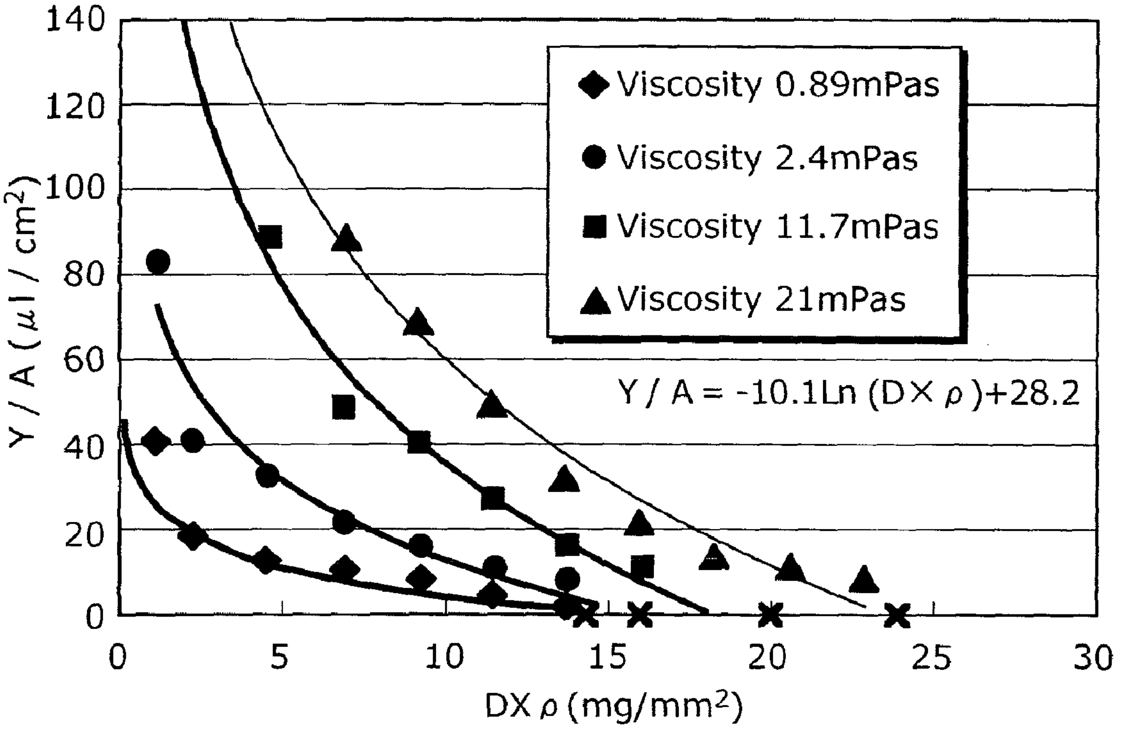
FIG. 11 is a graph showing a relation between a weight of the target for each level of viscosity of the liquid and a value resulting from dividing an amount of the liquid to be attached per unit area by viscosity of the liquid.
Figure 12:
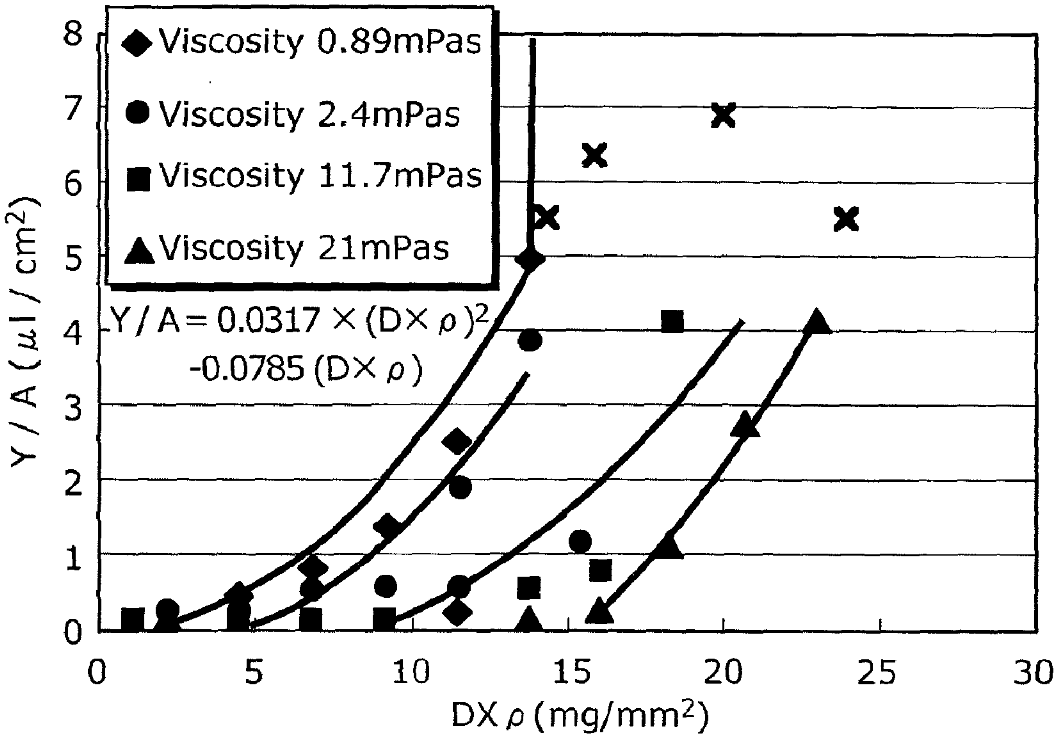
FIG. 12 is a graph showing a relation between a weight of the target for each level of viscosity of the liquid and a value resulting from multiplying an amount of the liquid to be attached per unit area by viscosity of the liquid.

FIGS. 11 and 12 are the same as FIGS. 6 and 7, respectively.

In FIGS. 11 and 12, particular focus is put on the viscosity of water, i.e., 0.89 mPa·s. Referring to FIG. 11, it is necessary for the viscosity 0.89 mPa·s to satisfy the range Y/A≦−10.1×Ln (D×ρ)+28.2. Referring to FIG. 12, it is necessary for the viscosity 0.89 mPa·s to satisfy the range Y/A≧0.0317×(D×ρ)^2−0.0785×(D×ρ). In addition, referring to both of FIGS. 11 and 12, the above ranges need to satisfy 0<(D×ρ)≦13.8.

It is to be noted that even in the case where the separation subject 101 contains a viscous non-target 2, the target 1 can be extracted from the separation subject 101 by attaching the liquid to the target 1 in the same manner.

For example, in the case where the separation subject 101 includes a viscous non-target 2 such as rubber or a packing tape, the non-target 2 may adhere to the catch member 140 when the separation subject 101 and the catch member 140 are making contact. In this case, the target 1 and the non-target 2 will be collected by being scraped off with a blade, resulting in a decrease in the separation accuracy. Moreover, if a viscous component of the target 1 or the non-target 2 remains on the separation station 3 or the catch member 140, an incoming non-target 2 may adhere to the catch member 140 in the following step, which is unfavorable.

However, this viscous component usually has such a low adhesiveness to the catch member 140 as to be easily removed through regular washing of the separation station 3 and the catch member 140.

As above, in the case where the separation subject 101 includes the viscous non-target 2, the separation accuracy varies depending on the type and content of the viscous non-target 2, but it is still possible to provide desired separation accuracy by regularly washing the catch member 140 and the like. Consequently, in the process according to the present invention, a desired resin can be separated even in the case where the target 1 and the non-target 2 are somewhat viscous.

The separation method according to the present invention is applicable to recycling of resources as a separation method in which a specified material can be selected out from a mixture piece composed of resin, metal, glass, and the like, which is produced by crushing waste home appliances, general wastes, etc. The separation method is particularly effective for a small mixture piece of such a size that cannot be separated by the conventional air injection. Furthermore, the separation method is effective also for separating a rare metal, for which recycling demand is expected to expand in the future.

REFERENCE SIGNS LIST

1 Target
2 Non-target
3 Separation station
4 Distinguishing sensor
7 Blade
100 Separation apparatus
101 Separation subject
110 Distinguishing unit
120 Positional information obtaining unit
130 Applying unit
140 Catch unit
150 Actuator
160 Shaping unit
200 Belt conveyor
A Target area
D Thickness of target
U Viscosity
Y Amount of liquid
ρ Density

The invention claimed is:

1. A separation method of extracting a target from a separation subject in which the target to be extracted and a non-target not to be extracted are mixed, said separation method comprising:

distinguishing the target from the non-target;

obtaining positional information of the target distinguished in said distinguishing step;

applying a liquid to the target based on the positional information, wherein the liquid is applied to the target after said distinguishing and obtaining steps; and extracting the target from the separation subject by bringing a catch member into contact with the separation subject such that viscosity of the liquid causes the target to adhere to the catch member, wherein the liquid applied to the target in the applying step satisfies all of the following expressions (1) to (4):

$$D\times\rho \leqq 23; \quad (1)$$

$$(Y\times U)/A \geqq 0.1055\times\exp(0.255\times D\times\rho); \quad (2)$$

$$(Y\times U)/A \geqq 1.05; \text{ and} \quad (3)$$

$$Y/(A\times U) \leqq -1.2\times\mathrm{Ln}(D\times\rho)+3.8 \quad (4)$$

where Y is an amount (in μl) of the liquid applied to the target, U is the viscosity (in mPa·s) of the liquid, D is a thickness (in mm) of the target, A is an area (in $cm^2$) of the target, and ρ is density (in $mg/mm^3$) of the target.

2. The separation method according to claim 1, wherein, in said distinguishing step, using infrared rays, the target and the non-target are distinguished by a difference in constituent substance.

3. The separation method according to claim 1, further comprising shaping the target and the non-target included in the separation subject until the target and the non-target reach a predetermined thickness, wherein the shaping step is performed before the distinguishing step.

4. The separation method according to claim 3, wherein, in the shaping step, the target and the non-target are shaped by a shaping unit comprising a press roll.

5. The separation method according to claim 1, wherein the thickness D of the target is in a range of 1.15 mm to 23 mm.

6. The separation method according to claim 1, wherein 0.89 mPa·s≦U≦21 mPa·s is satisfied where U is the viscosity (in mPa·s) of the liquid.

7. The separation method according to claim 1, wherein, in the applying step, the liquid is applied to the target by an applying unit that includes at least one nozzle capable of dispensing a predetermined amount of droplets of the liquid onto the target.

8. The separation method according to claim 1, wherein the catch member comprises an endless belt.

9. The separation method according to claim 1, further comprising collecting the target by separating the target from the catch member following the extracting step.

10. A separation method of extracting a target from a separation subject in which the target to be extracted and a non-target not to be extracted are mixed, said separation method comprising:

distinguishing the target from the non-target;

obtaining positional information of the target distinguished in said distinguishing step;

applying a liquid to the target based on the positional information, wherein the liquid is applied to the target after said distinguishing and obtaining steps; and extracting the target from the separation subject by bringing a catch member into contact with the separation subject such that viscosity of the liquid causes the target to adhere to the catch member, wherein the liquid applied to the target in the attaching step satisfies both of the following expressions (1) and (2):

$$0<D\times\rho\leqq 13.8;\ \text{and} \quad (1)$$

$$-10.1\times \mathrm{Ln}(D\times\rho)+28.2\geqq Y/A\geqq 0.0317\times(D\times\rho)\hat{\ }2-0.0785\times(D\times\rho) \quad (2)$$

where Y is an amount (in μl) of the liquid applied to the target, D is a thickness (in mm) of the target, A is an area (in $cm^2$) of the target, and ρ is density (in $mg/mm^3$) of the target.

11. The separation method according to claim 10, wherein, in said distinguishing step, using infrared rays, the target and the non-target are distinguished by a difference in constituent substance.

12. The separation method according to claim 10, further comprising shaping the target and the non-target included in the separation subject until the target and the non-target reach a predetermined thickness, wherein the shaping step is performed before the distinguishing step.

13. The separation method according to claim 12, wherein, in the shaping step, the target and the non-target are shaped by a shaping unit comprising a press roll.

14. The separation method according to claim 10, wherein the thickness D of the target is in a range of 1.15 mm to 23 mm.

15. The separation method according to claim 10, wherein 0.89 mPa·s≦U≦21 mPa·s is satisfied where U is the viscosity (in mPa·s) of the liquid.

16. The separation method according to claim 10, wherein, in the applying step, the liquid is applied to the target by an applying unit that includes at least one nozzle capable of dispensing a predetermined amount of droplets of the liquid onto the target.

17. The separation method according to claim 10, wherein the catch member comprises an endless belt.

18. The separation method according to claim 10, further comprising collecting the target by separating the target from the catch member following the extracting step.

* * * * *